US011716019B2

(12) United States Patent
Mitani et al.

(10) Patent No.: US 11,716,019 B2
(45) Date of Patent: Aug. 1, 2023

(54) POWER SUPPLY CIRCUIT

(71) Applicant: HONDA MOTOR CO., LTD., Tokyo (JP)

(72) Inventors: Manabu Mitani, Wako (JP); Sadao Shinohara, Wako (JP); Akinori Kita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/688,935

(22) Filed: Mar. 8, 2022

(65) Prior Publication Data

US 2022/0311334 A1    Sep. 29, 2022

(30) Foreign Application Priority Data

Mar. 25, 2021  (JP) ................ 2021-051794

(51) Int. Cl.
*H02M 3/04*  (2006.01)
*H02J 7/00*  (2006.01)

(52) U.S. Cl.
CPC ............. *H02M 3/04* (2013.01); *H02J 7/0013* (2013.01); *H02J 7/0063* (2013.01)

(58) Field of Classification Search
None
See application file for complete search history.

(56) References Cited

U.S. PATENT DOCUMENTS

| | | | |
|---|---|---|---|
| 10,981,455 B2* | 4/2021 | Otsuki | ............. B60L 50/40 |
| 11,427,179 B2* | 8/2022 | Oiwa | ............. B60W 20/10 |
| 2022/0263337 A1* | 8/2022 | Mitani | ............. H02J 7/0063 |

FOREIGN PATENT DOCUMENTS

JP    2014-143863    8/2014

* cited by examiner

*Primary Examiner* — Jeffery S Zweizig
(74) *Attorney, Agent, or Firm* — Amin, Turocy & Watson, LLP

(57) ABSTRACT

A power supply circuit sets a precharge current flowing through a first load device and a precharge current flowing through a second load device during charging to a first allowable current or less, thereafter sets the precharge current flowing through the first load device to the first allowable current or less, sets the precharge current flowing through the second load device to the second allowable current or less, and sets a maximum value of the precharge current flowing through the second load device to be larger than the first allowable current.

2 Claims, 6 Drawing Sheets

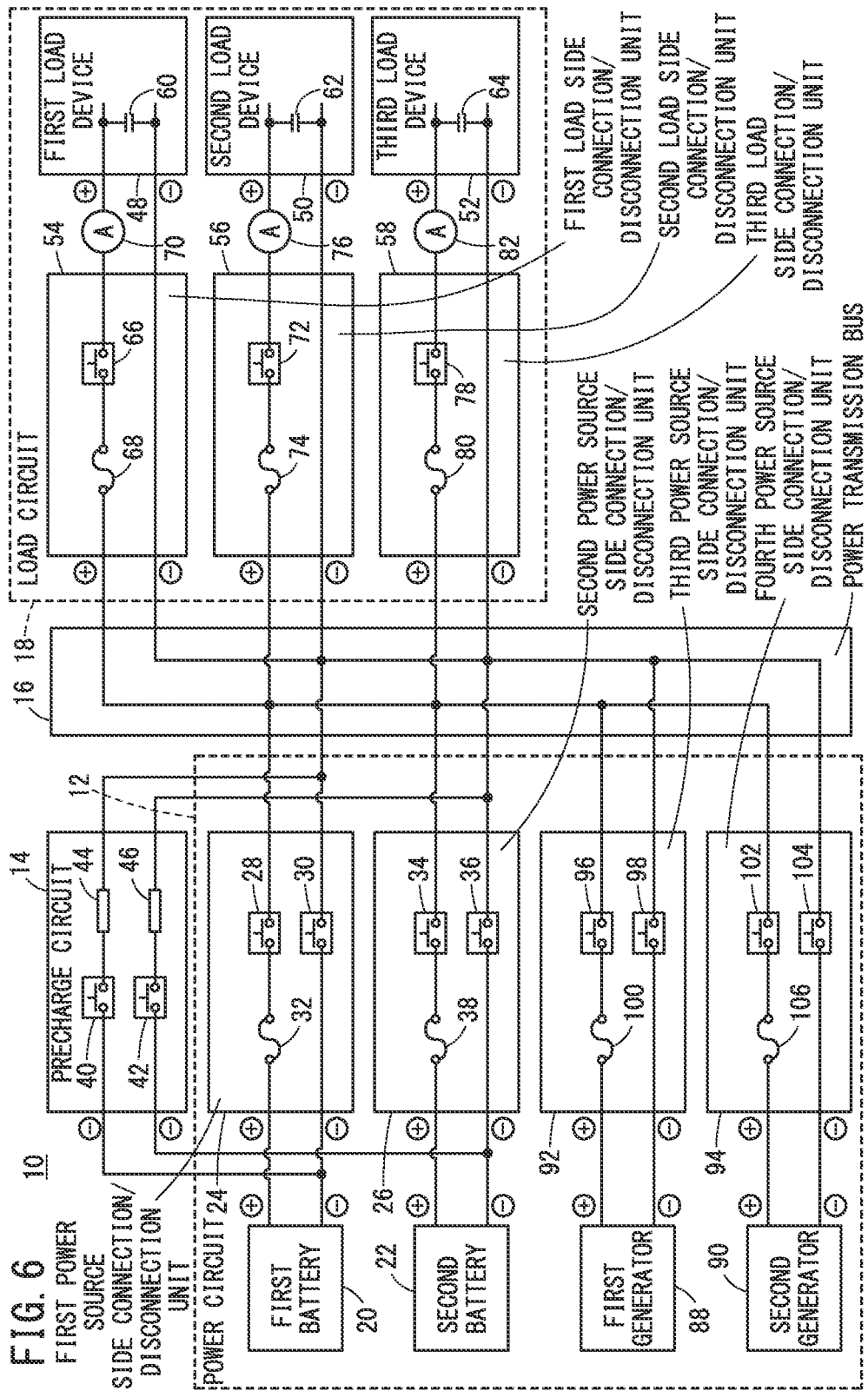

POWER SUPPLY CIRCUIT

CROSS-REFERENCE TO RELATED APPLICATIONS

This application is based upon and claims the benefit of priority from Japanese Patent Application No. 2021-051794 filed on Mar. 25, 2021, the contents of which are incorporated herein by reference.

BACKGROUND OF THE INVENTION

Field of the Invention

The present invention relates to a power supply circuit.

Description of the Related Art

JP 2014-143863 A discloses a power supply device for a vehicle. The vehicle power supply device supplies electric power from one high-voltage battery to two loads. The two loads are an inverter and a converter.

SUMMARY OF THE INVENTION

In the vehicle power supply device disclosed in JP 2014-143863 A, a precharge circuit is provided on the battery side, and voltages applied to the respective loads are equal to each other when a capacitor is charged. When the capacitance of the capacitor of each load is different, it is necessary to set the voltage applied to each load in accordance with the allowable current of the capacitor having a small capacitance. Accordingly, there is a problem in that it takes time to charge a capacitor having a large capacitance.

An object of the present invention is to solve the aforementioned problem.

According to an aspect of the present invention, there is provided a power supply circuit including: a power circuit including one or more power sources; a load circuit in which at least a first load including a first capacitor with a first allowable current and a second load including a second capacitor with a second allowable current larger than the first allowable current are connected in parallel; a precharge circuit configured to adjust a precharge current when electric power is supplied from the power sources to the first load and the second load to charge the first capacitor and the second capacitor; and a control unit that controls the precharge circuit, wherein the control unit: performs a first precharge control of controlling the precharge circuit in a manner that a precharge current flowing through the first load and a precharge current flowing through the second load during charging are equal to or less than the first allowable current; and performs, after the first precharge control, a second precharge control of controlling the precharge circuit in a manner that the precharge current flowing through the first load is equal to or smaller than the first allowable current, the precharge current flowing through the second load is equal to or smaller than the second allowable current, and a maximum value of the precharge current flowing through the second load is larger than the first allowable current.

According to the present invention, the charging time of the capacitor can be shortened.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a circuit diagram of the power supply circuit.

DESCRIPTION OF THE INVENTION

First Embodiment

[Configuration of Power Supply Circuit]

Figure 1:
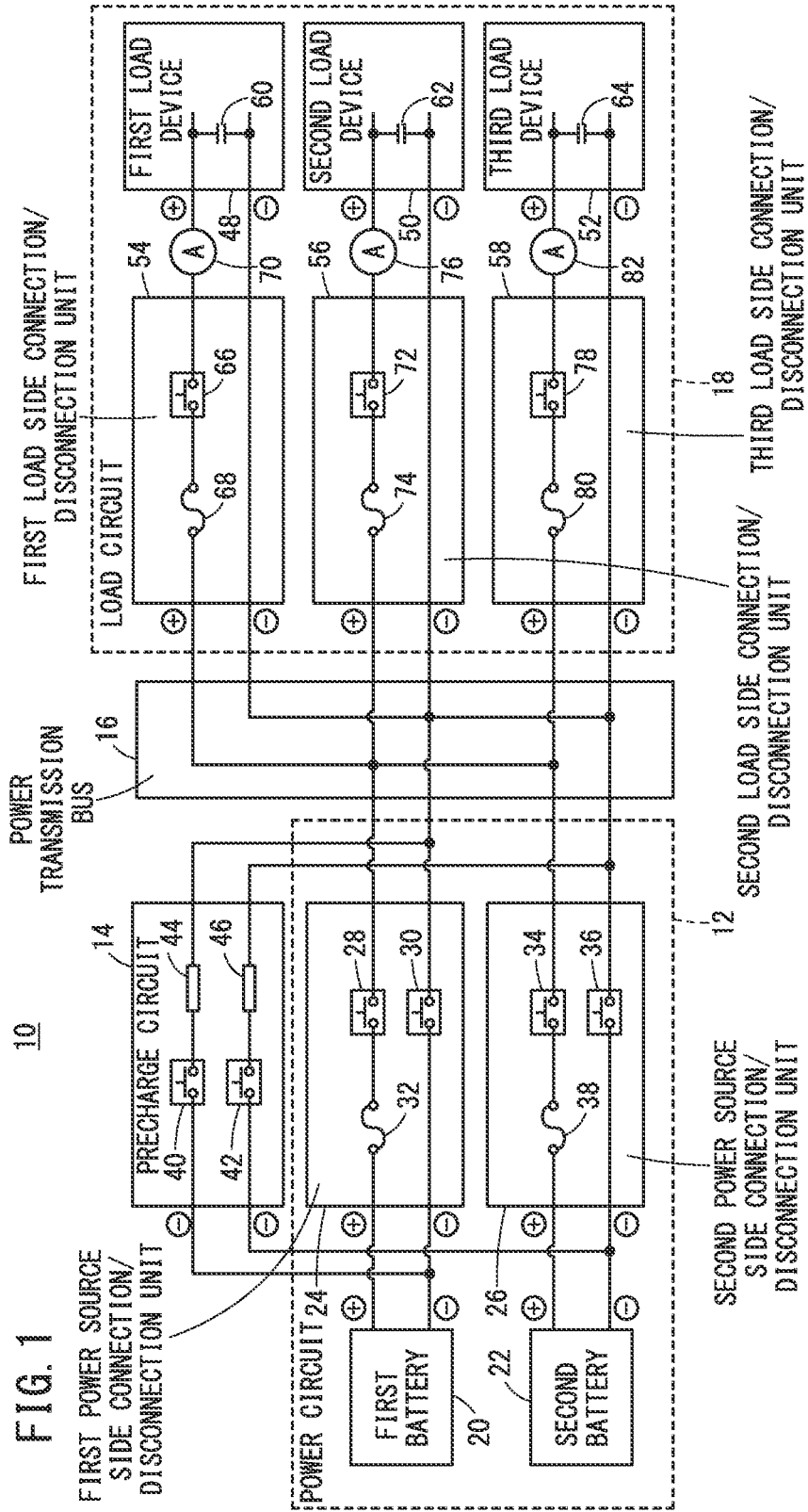
FIG. 1 is a circuit diagram of a power supply circuit.

FIG. 1 is a circuit diagram of a power supply circuit 10 according to the present embodiment. The power supply circuit 10 includes a power circuit 12, a precharge circuit 14, a power transmission bus 16, and a load circuit 18.

The power circuit 12 includes a first battery (power source) 20, a second battery (power source) 22, a first power source side connection/disconnection unit 24, and a second power source side connection/disconnection unit 26. The battery voltages of the first battery 20 and the second battery 22 of the present embodiment are both E [V].

The first power source side connection/disconnection unit 24 is provided between the first battery 20 and the power transmission bus 16. The first power source side connection/disconnection unit 24 includes a positive electrode switch 28, a negative electrode switch 30, and a fuse 32. The positive electrode switch 28 is provided on a positive electrode wiring that connects the first battery 20 and the power transmission bus 16. The negative electrode switch 28 is provided on a negative electrode wiring that connects the first battery 20 and the power transmission bus 16. The fuse 32 is connected in series with the positive electrode switch 28. When at least one of the positive electrode switch 28 and the negative electrode switch 30 is OFF, the first battery 20 and the power transmission bus 16 are electrically disconnected. When both of the positive electrode switch 28 and the negative electrode switch 30 are ON, the first battery 20 and the power transmission bus 16 are electrically connected.

The second power source side connection/disconnection unit 26 is provided between the second battery 22 and the power transmission bus 16. The second power source side connection/disconnection unit 26 includes a positive electrode switch 34, a negative electrode switch 36, and a fuse 38. The positive electrode switch 34 is provided on a positive electrode wiring that connects the second battery 22 and the power transmission bus 16. The negative electrode switch 36 is provided on a negative electrode wiring that connects the second battery 22 and the power transmission bus 16. The fuse 38 is connected in series with the positive electrode switch 34. When at least one of the positive electrode switch 34 and the negative electrode switch 36 is OFF, the second battery 22 and the power transmission bus 16 are electrically disconnected. When both of the positive electrode switch 34 and the negative electrode switch 36 are ON, the second battery 22 and the power transmission bus 16 are electrically connected.

The precharge circuit 14 includes a first precharge switch 40 and a second precharge switch 42. The first precharge switch 40 is connected in parallel with the negative electrode switch 30 of the first power source side connection/disconnection unit 24. The second precharge switch 42 is connected in parallel with the negative electrode switch 36 of the second power source side connection/disconnection unit 26. A precharge resistor 44 is connected in series with the first precharge switch 40. A precharge resistor 46 is connected in series with the second precharge switch 42. The resistance values of the precharge resistors 44 and 46 are both R [Ω].

When the positive electrode switch 28 of the first power source side connection/disconnection unit 24 is ON and the first precharge switch 40 is ON, the first battery 20 and the power transmission bus 16 are electrically connected via the precharge circuit 14. In this case, the negative electrode switch 30 of the first power source side connection/disconnection unit 24 is turned off. When the positive electrode switch 34 of the second power source side connection/disconnection unit 26 is ON and the second precharge switch 42 is ON, the second battery 22 and the power transmission bus 16 are electrically connected via the precharge circuit 14. In this case, the negative electrode switch 36 of the second power source side connection/disconnection unit 26 is turned off.

The load circuit 18 includes a first load device 48, a second load device 50, a third load device 52, a first load side connection/disconnection unit 54, a second load side connection/disconnection unit 56, and a third load side connection/disconnection unit 58.

The first load device 48 includes a capacitor 60. The capacitance of the capacitor 60 of the first load device 48 is C1. The second load device 50 includes a capacitor 62. The capacitance of the capacitor 62 of the second load device 50 is C2. The third load device 52 includes a capacitor 64. The capacitance of the capacitor 64 of the third load device 52 is C2.

The capacitance C1 is smaller than the capacitance C2. The allowable current during charging of the capacitor 60 is Imax_1 [A]. The allowable current during charging of the capacitor 62 and the capacitor 64 is Imax_2 [A].

The first load device 48 corresponds to a first load of the present invention, and the second load device 50 and the third load device 52 correspond to a second load of the present invention. The capacitor 60 corresponds to a first capacitor of the present invention, and the capacitor 62 and the capacitor 64 correspond to a second capacitor of the present invention.

The first load side connection/disconnection unit 54 is provided between the power transmission bus 16 and the first load device 48. The first load side connection/disconnection unit 54 includes a positive electrode switch 66 and a fuse 68. The positive electrode switch 66 is provided on a positive electrode wiring that connects the power transmission bus 16 and the first load device 48. The fuse 68 is connected in series with the positive electrode switch 66. An ammeter 70 is provided on the positive electrode wiring that connects the first load side connection/disconnection unit 54 and the first load device 48. When the positive electrode switch 66 is OFF, the power transmission bus 16 and the first load device 48 are electrically disconnected. When the positive electrode switch 66 is ON, the power transmission bus 16 and the first load device 48 are electrically connected.

The second load side connection/disconnection unit 56 is provided between the power transmission bus 16 and the second load device 50. The second load side connection/disconnection unit 56 includes a positive electrode switch 72 and a fuse 74. The positive electrode switch 72 is provided on a positive electrode wiring that connects the power transmission bus 16 and the second load device 50. The fuse 74 is connected in series with the positive electrode switch 72. An ammeter 76 is provided on the positive electrode wiring that connects the second load side connection/disconnection unit 56 and the second load device 50. When the positive electrode switch 72 is OFF, the power transmission bus 16 and the second load device 50 are electrically disconnected. When the positive electrode switch 72 is ON, the power transmission bus 16 and the second load device 50 are electrically connected.

The third load side connection/disconnection unit 58 is provided between the power transmission bus 16 and the third load device 52. The third load side connection/disconnection unit 58 includes a positive electrode switch 78 and a fuse 80. The positive electrode switch 78 is provided on a positive electrode wiring that connects the power transmission bus 16 and the third load device 52. The fuse 80 is connected in series with the positive electrode switch 78. An ammeter 82 is provided on the positive electrode wiring between the third load side connection/disconnection unit 58 and the third load device 52. When the positive electrode switch 78 is OFF, the power transmission bus 16 and the third load device 52 are electrically disconnected. When the positive electrode switch 78 is ON, the power transmission bus 16 and the third load device 52 are electrically connected.

The power transmission bus 16 electrically connects the power circuit 12 and the load circuit 18, and supplies electric power from the power circuit 12 to the load circuit 18. The power transmission bus 16 connects the first battery 20 and the second battery 22 in parallel. Further, the power transmission bus 16 connects the first load device 48, the second load device 50, and the third load device 52 in parallel.

Figure 2:
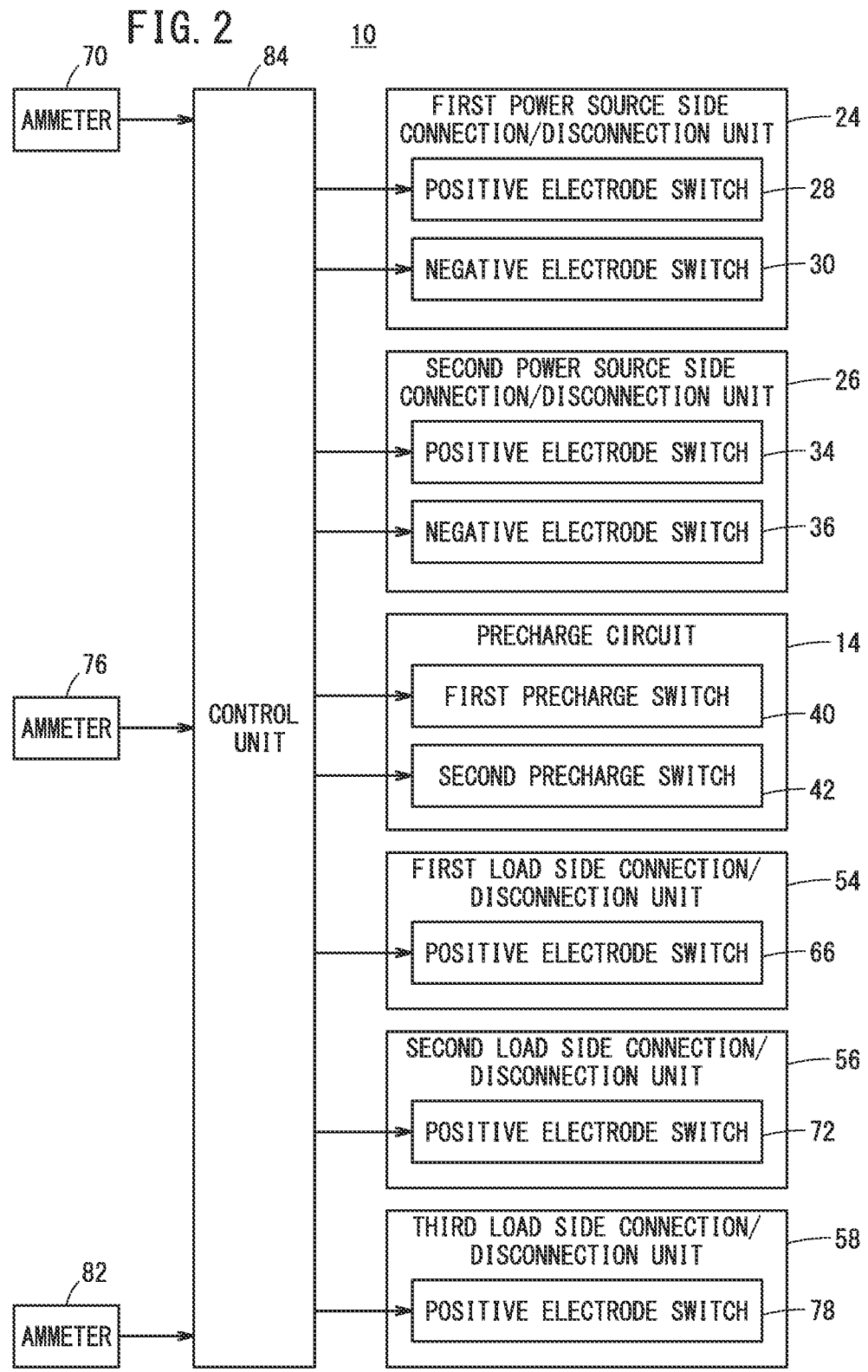
FIG. 2 is a block diagram of a power supply circuit.

FIG. 2 is a block diagram of the power supply circuit 10. The power supply circuit 10 includes a control unit 84. The control unit 84 switches between on and off for the positive electrode switch 28 and the negative electrode switch 30 of the first power source side connection/disconnection unit 24. In addition, the control unit 84 switches between on and off for the positive electrode switch 34 and the negative electrode switch 36 of the second power source side connection/disconnection unit 26. Further, the control unit 84 switches between on and off for the first precharge switch 40 and the second precharge switch 42 of the precharge circuit 14. Furthermore, the control unit 84 switches between on and off for the positive electrode switch 66 of the first load side connection/disconnection unit 54, the positive electrode switch 72 of the second load side connection/disconnection unit 56, and the positive electrode switch 78 of the third load side connection/disconnection unit 58.

The control unit 84 includes an arithmetic unit and a determination unit (not shown). The arithmetic unit and the determination unit may be realized by, for example, a processing circuitry.

The processing circuitry may be configured by an integrated circuit such as an application specific integrated circuit (ASIC) or a field-programmable gate array (FPGA). Further, the processing circuitry may be configured by an electronic circuit including a discrete device.

The processing circuitry may be configured by a processor such as a central processing unit (CPU) or a graphics processing unit (GPU), for example. In this case, the processing circuitry can be realized by executing a program stored in a storage unit (not illustrated) by the processor.

Although an example in which the power supply circuit 10 includes two batteries, i.e., the first battery 20 and the second battery 22, has been described above, the number of batteries may be one, or three or more. Although the example in which the power supply circuit 10 includes the three load devices, i.e., the first load device 48, the second load device 50, and the third load device 52, has been described above, the number of load devices may be two or more. When the precharge circuit 14 is provided on a side of the power circuit 12 as in the present embodiment, the number of batteries is smaller than the number of load devices. This is effective in reducing the weight of the power supply circuit 10.

The power supply circuit 10 may include a large-capacity capacitor in place of the first battery 20 and the second battery 22. The power supply circuit 10 may include a large-capacity capacitor in addition to the first battery 20 and the second battery 22. The power transmission bus 16 may include a fuse or a switch for circuit protection.

[Precharge Control Process]

Figure 3:
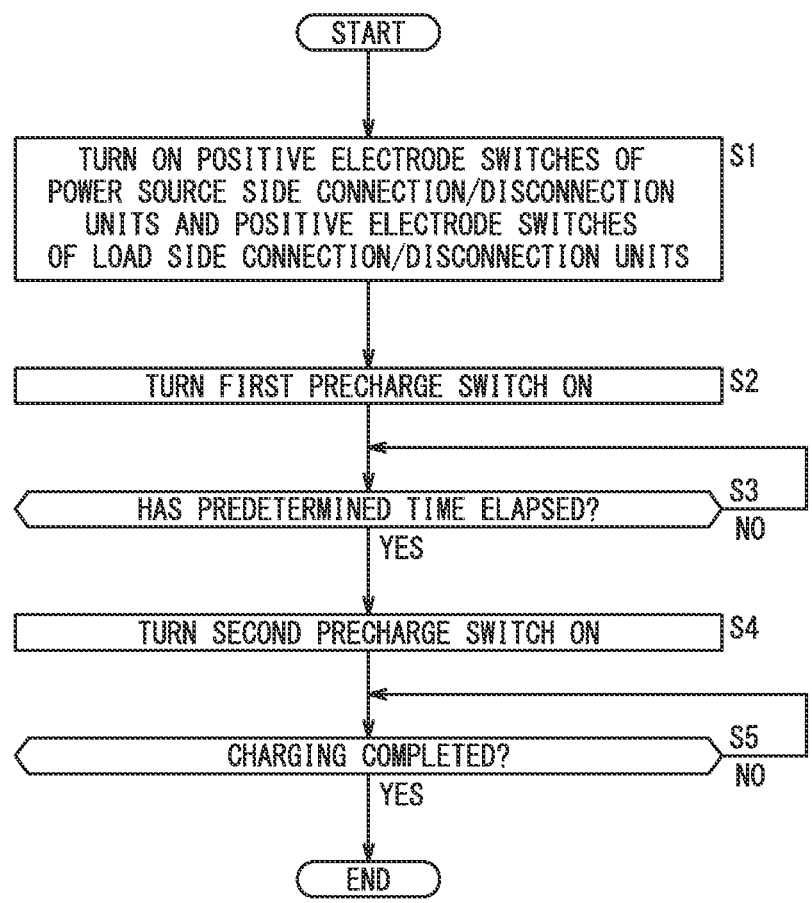
FIG. 3 is a flowchart showing the flow of the precharge control process.

FIG. 3 is a flowchart showing the flow of precharge control performed by the control unit 84. By the precharge control, the capacitor 60 of the first load device 48, the capacitor 62 of the second load device 50, and the capacitor 64 of the third load device 52 are charged. The precharge control is executed at the time when the first load device 48, the second load device 50, and the third load device 52 are activated. Before these devices are activated, the positive electrode switch 28 and the negative electrode switch 30 of the first power source side connection/disconnection unit 24 are controlled to be turned off. Further, the positive electrode switch 34 and the negative electrode switch 36 of the second power source side connection/disconnection unit 26 are controlled to be turned off. Further, the first precharge switch 40 and the second precharge switch 42 of the precharge circuit 14 are controlled to be turned off. Furthermore, the positive electrode switch 66 of the first load side connection/disconnection unit 54, the positive electrode switch 72 of the second load side connection/disconnection unit 56, and the positive electrode switch 78 of the third load side connection/disconnection unit 58 are controlled to be turned off.

In step S1, the control unit 84 switches from OFF to ON for the positive electrode switch 28 of the first power source side connection/disconnection unit 24, the positive electrode switch 34 of the second power source side connection/disconnection unit 26, the positive electrode switch 66 of the first load side connection/disconnection unit 54, the positive electrode switch 72 of the second load side connection/disconnection unit 56, and the positive electrode switch 78 of the third load side connection/disconnection unit 58. Thereafter, the process proceeds to step S2.

In step S2, the control unit 84 switches the first precharge switch 40 of the precharge circuit 14 from OFF to ON. Thereafter, the process proceeds to step S3. The process of step S2 corresponds to the first precharge control of the present invention.

In step S3, the control unit 84 determines whether a predetermined time has elapsed since the first precharge switch 40 of the precharge circuit 14 was turned on. If the predetermined time has elapsed, the process proceeds to step S4, and if the predetermined time has not elapsed, the process of step S3 is repeated.

In step S4, the control unit 84 switches the second precharge switch 42 of the precharge circuit 14 from OFF to ON. Thereafter, the process proceeds to step S5. The process of step S4 corresponds to the second precharge control of the present invention.

In step S5, the control unit 84 determines whether charging of the capacitor 60 of the first load device 48, the capacitor 62 of the second load device 50, and the capacitor 64 of the third load device 52 has been completed. When the charging is completed, the precharge control process is ended, and when the charging is not completed, the process of step S5 is repeated.

[Time Chart During Precharge Control Process]

Figure 4:
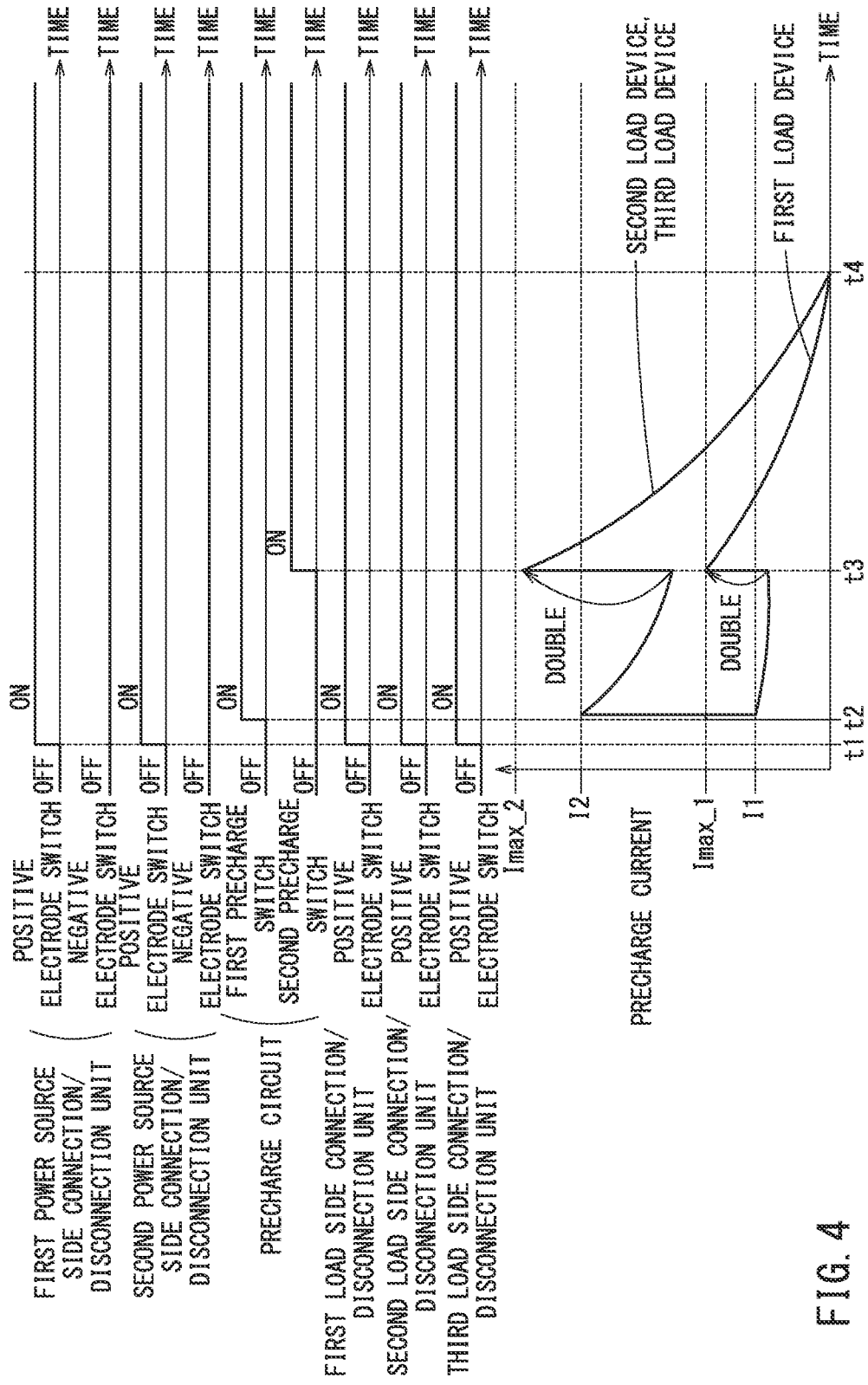
FIG. 4 is a time chart during the precharge control process.

FIG. 4 is a time chart during the precharge control process. The upper time chart of FIG. 4 shows a state in which each switch is turned on or off. The lower time chart of FIG. 4 shows temporal change in the precharge current flowing through each of the first load device 48, the second load device 50, and the third load device 52, detected by each of the ammeter 70, the ammeter 76, and the ammeter 82.

At time point t1, the control unit 84 switches from OFF to ON each for the positive electrode switch 28 of the first power source side connection/disconnection unit 24, the positive electrode switch 34 of the second power source side connection/disconnection unit 26, the positive electrode switch 66 of the first load side connection/disconnection unit 54, the positive electrode switch 72 of the second load side connection/disconnection unit 56, and the positive electrode switch 78 of the third load side connection/disconnection unit 58. At this time, each of the first load device 48, the second load device 50, and the third load device 52 is electrically disconnected from the first battery 20 and the second battery 22. Therefore, electric power is not supplied to each of the first load device 48, the second load device 50, and the third load device 52.

At time point t2, the control unit 84 switches the first precharge switch 40 of the precharge circuit 14 from OFF to ON. At this time, the voltage dropped from the battery voltage of the first battery 20 by the precharge resistor 44 is applied to each of the first load device 48, the second load device 50, and the third load device 52. The resistance value R [Ω] of the precharge resistor 44 is set such that the magnitude of the precharge current flowing through the first load device 48, the second load device 50, and the third load device 52 is equal to or less than the allowable current Imax_1 [A] of the first load device 48 immediately after the first precharge switch 40 has been switched from OFF to ON.

When the resistance value R [Ω] of the precharge resistor 44 is set so that the magnitude of the precharge current at the time point t2 becomes the allowable current Imax_1 [A], the allowable current Imax_1 [A] can be expressed by the following equation. Here, it is assumed that the battery voltage of the first battery 20 is E [V] as described above, the resistance value of the wiring resistance in the power circuit 12 is 0 [Ω], and the resistance value of each of a first resistance to a third resistance described later is r [Ω]. Note that the resistance value r [Ω] is sufficiently smaller than the resistance value R [Ω] of the precharge resistor 44.

$$I\max\_1[A]=E/(r+3R)$$

The first resistance is a combined resistance of the resistance of the first load side connection/disconnection unit 54, the resistance of the ammeter 70, the resistance of the first load device 48, the resistance of the wiring connecting the first load side connection/disconnection unit 54 and the ammeter 70, and the resistance of the wiring connecting the ammeter 70 and the first load device 48. The second resistance is a combined resistance of the resistance of the second load side connection/disconnection unit 56, the resistance of the ammeter 76, the resistance of the second load device 50, the resistance of the wiring connecting the second load side connection/disconnection unit 56 and the ammeter 76, and the resistance of the wiring connecting the ammeter 76 and the second load device 50. The third resistance is a combined resistance of the resistance of the third load side connection/disconnection unit 58, the resistance of the ammeter 82, the resistance of the third load device 52, the resistance of the wiring connecting the third load side connection/disconnection unit 58 and the ammeter 82, and the resistance of the wiring connecting the ammeter 82 and the third load device 52.

Immediately after the time point t2, the precharge current flowing through the first load device 48 drops abruptly to the current I1. The current I1 can be expressed by the following equation.

$$I1[A] \approx \{(3E)/(3R+r)\} \times \{C1/(C1+2 \times C2)\}$$

Immediately after the time point t2, the precharge current flowing through each of the second load device 50 and the third load device 52 rapidly rises to the current I2. The current I2 can be expressed by the following equation.

$$I2[A] \approx \{(3E)/(3R+r)\} \times \{C2/(C1+2 \times C2)\}$$

Thereafter, charging of the capacitor 60 of the first load device 48, the capacitor 62 of the second load device 50, and the capacitor 64 of the third load device 52 proceeds, and the precharge current decreases as time elapses.

At time point t3 after a lapse of the predetermined time from the time point t2, the control unit 84 switches the second precharge switch 42 of the precharge circuit 14 from OFF to ON. When the second precharge switch 42 is switched from OFF to ON, the precharge resistor 44 and the precharge resistor 46 are connected in parallel to the power circuit 12. Therefore, the combined resistance value of the precharge resistor 44 and the precharge resistor 46 is R/2 [Ω]. Further, the resistance value r [Ω] of each of the first resistance to the third resistance described above is sufficiently smaller than the resistance value R [Ω] of the precharge resistor 44, and thus can be regarded as 0. Therefore, the precharge current flowing through each of the first load device 48, the second load device 50, and the third load device 52 immediately after the second precharge switch 42 has been switched from OFF to ON is twice the precharge current immediately before the second precharge switch 42 is switched from OFF to ON.

The above-described predetermined time is set such that the precharge current flowing through the first load device 48, the second load device 50, and the third load device 52 satisfy both of the following conditions (1) and (2) after the time point t2 at which the first precharge switch 40 is turned on:

(1) The precharge current flowing through the first load device 48 is equal to or less than half (½) the allowable current Imax_1 [A]; and (2) The precharge current flowing through the second load device 50 and the third load device 52 is equal to or less than half (½) the allowable current Imax_2.

In the control unit 84, the determination that the predetermined time has elapsed from the time point t2 when the first precharge switch 40 of the precharge circuit 14 was switched from OFF to ON may be replaced with the following determination. That is, the control unit 84 may determine that the precharge current flowing through the first load device 48, the second load device 50, and the third load device 52 satisfies both of the above conditions (1) and (2).

At the time point t4, the precharge current flowing through each of the first load device 48, the second load device 50, and the third load device 52 becomes substantially 0 [A]. Thus, charging of the capacitor 60 of the first load device 48, the capacitor 62 of the second load device 50, and the capacitor 64 of the third load device 52 is completed.

Action and Effects

When electric power is supplied from a common battery to a plurality of loads to charge capacitors of the respective loads, a precharge circuit is provided on the load side, so that a precharge current corresponding to an allowable current of each capacitor is made to flow.

On the other hand, when the number of loads is greater than the number of batteries, by providing the precharge circuit on the battery side, the number of switches and the like can be reduced, and the weight of the power supply circuit can be reduced. In this case, since the precharge resistance of the precharge circuit is set in accordance with the allowable current of a capacitor having the smallest capacitance, there is a problem that it takes time to charge another capacitor having a large capacitance.

Therefore, in the power supply circuit 10 of the present embodiment, the control unit 84 performs the first precharge control when charging of the capacitor 60 of the first load device 48, the capacitor 62 of the second load device 50, and the capacitor 64 of the third load device 52 is started. Then, the control unit 84 performs the second precharge control after a predetermined time elapses from the start of the first precharge control.

In the first precharge control, the control unit 84 controls the precharge circuit 14 to set the precharge current flowing through the first load device 48, the second load device 50, and the third load device 52 to be equal to or less than the allowable current Imax_1 [A].

In the second precharge control, the control unit 84 controls the precharge circuit 14 so that the precharge current flowing through the first load device 48 is equal to or less than the allowable current Imax_1 [A]. Further, in the second precharge control, the control unit 84 sets the precharge current flowing through the second load device 50 and the third load device 52 to be equal to or less than the allowable current Imax_2 and sets the maximum value of the precharge current to be larger than the allowable current Imax_1 [A].

Accordingly, in the power supply circuit 10 of the present embodiment, the precharge current flowing through the first load device 48 can be suppressed so as to be equal to or less than the allowable current Imax_1 [A] in the process from the first precharge control to the second precharge control. Further, in the second precharge control, the maximum value of the precharge current flowing through the second load device 50 and the third load device 52 can be made larger than the allowable current Imax_1 [A]. Therefore, it is possible to shorten the charging time of the capacitor 62 of the second load device 50 and the capacitor 64 of the third load device 52.

Other Embodiment 1

The first load side connection/disconnection unit 54 of the first embodiment includes a positive electrode switch 66 provided on the positive electrode wiring and a fuse 68 connected in series with the positive electrode switch 66. The configuration of the first load side connection/disconnection unit 54 may be different from the configuration of the first embodiment.

Figure 5A:
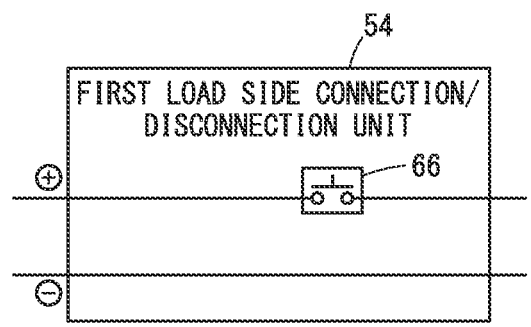
FIGS. 5A and 5B are diagrams showing a circuit configuration of the first load side connection/disconnection unit.
Figure 5B:
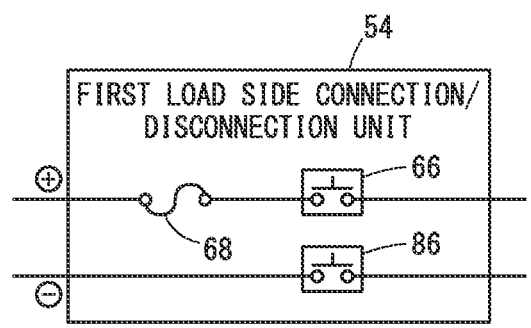

FIGS. 5A and 5B illustrate the circuit configuration of the first load side connection/disconnection unit 54. For example, as shown in FIG. 5A, the fuse 68 may be omitted from the first load side connection/disconnection unit 54. In addition, as shown in FIG. 5B, a negative electrode switch 86 may be provided on the negative electrode wiring of the first load side connection/disconnection unit 54.

The configurations of the second load side connection/disconnection unit 56 and the third load side connection/disconnection unit 58 may also be changed in the same manner as the first load side connection/disconnection unit 54.

Other Embodiment 2

The power supply circuit 10 according to the first embodiment includes the first battery 20 and the second battery 22 as power sources. The power supply circuit 10 may include a first generator 88 and a second generator 90 in addition to the first battery 20 and the second battery 22.

FIG. 6 is a circuit diagram of the power supply circuit 10. When the first generator 88 and the second generator 90 are provided in the power supply circuit 10, it is necessary to further provide a third power source side connection/disconnection unit 92 and a fourth power source side connection/disconnection unit 94.

The third power source side connection/disconnection unit 92 is provided between the first generator 88 and the power transmission bus 16. The third power source side connection/disconnection unit 92 includes a positive electrode switch 96, a negative electrode switch 98, and a fuse 100. The positive electrode switch 96 is provided on a positive electrode wiring connecting the first generator 88 and the power transmission bus 16. The negative electrode switch 98 is provided on a negative electrode wiring that connects the first generator 88 and the power transmission bus 16. The fuse 100 is connected in series with the positive electrode switch 96. When at least one of the positive electrode switch 96 and the negative electrode switch 98 is OFF, the first generator 88 and the power transmission bus 16 are electrically disconnected. When both of the positive electrode switch 96 and the negative electrode switch 98 are ON, the first generator 88 and the power transmission bus 16 are electrically connected.

The fourth power source side connection/disconnection unit 94 is provided between the second generator 90 and the power transmission bus 16. The fourth power source side connection/disconnection unit 94 includes a positive electrode switch 102, a negative electrode switch 104, and a fuse 106. The positive electrode switch 102 is provided on a positive electrode wiring that connects the second generator 90 and the power transmission bus 16. The negative electrode switch 104 is provided on a negative electrode wiring that connects the second generator 90 and the power transmission bus 16. The fuse 106 is connected in series with the positive electrode switch 102. When at least one of the positive electrode switch 102 and the negative electrode switch 104 is OFF, the second generator 90 and the power transmission bus 16 are electrically disconnected. When both of the positive electrode switch 102 and the negative electrode switch 104 are ON, the second generator 90 and the power transmission bus 16 are electrically connected.

Invention Obtained from Embodiments

The invention that can be understood from the above embodiments will be described below.

A power supply circuit (10) includes: a power circuit (12) including one or more power sources (20, 22); a load circuit (18) in which at least a first load (48) including a first capacitor (60) with a first allowable current and a second load (50, 52) including a second capacitor (62, 64) with a second allowable current larger than the first allowable current are connected in parallel; a precharge circuit (14) configured to adjust a precharge current when electric power is supplied from the power sources to the first load and the second load to charge the first capacitor and the second capacitor; and a control unit (84) that controls the precharge circuit. The control unit performs a first precharge control of controlling the precharge circuit in a manner that a precharge current flowing through the first load and a precharge current flowing through the second load during charging are equal to or less than the first allowable current; and performs, after the first precharge control, a second precharge control of controlling the precharge circuit in a manner that the precharge current flowing through the first load is equal to or smaller than the first allowable current, the precharge current flowing through the second load is equal to or smaller than the second allowable current, and a maximum value of the precharge current flowing through the second load is larger than the first allowable current.

In the power supply circuit, the control unit may perform, after the first precharge control, the second precharge control when the ratio of the precharge current flowing through the first load to the first allowable current becomes equal to or less than a predetermined ratio and the ratio of the precharge current flowing through the second load to the second allowable current becomes equal to or less than a predetermined ratio.

The present invention is not particularly limited to the embodiment described above, and various modifications are possible without departing from the essence and gist of the present invention.

What is claimed is:

1. A power supply circuit comprising:
   a power circuit including one or more power sources;
   a load circuit in which at least a first load including a first capacitor with a first allowable current and a second load including a second capacitor with a second allowable current larger than the first allowable current are connected in parallel; and
   a precharge circuit configured to adjust a precharge current when electric power is supplied from the power sources to the first load and the second load to charge the first capacitor and the second capacitor,
   the power supply circuit further comprising one or more processing circuitries, wherein
   the one or more processing circuitries:
   perform a first precharge control of controlling the precharge circuit in a manner that a precharge current flowing through the first load and a precharge current flowing through the second load during charging are equal to or smaller than the first allowable current; and
   perform, after the first precharge control, a second precharge control of controlling the precharge circuit in a manner that the precharge current flowing through the first load is equal to or smaller than the first allowable current, the precharge current flowing through the second load is equal to or smaller than the second allowable current, and a maximum value of the precharge current flowing through the second load is larger than the first allowable current.

2. The power supply circuit according to claim 1, wherein the one or more processing circuitries:

perform, after the first precharge control, the second precharge control when a ratio of the precharge current flowing through the first load to the first allowable current becomes equal to or less than a predetermined ratio and a ratio of the precharge current flowing through the second load to the second allowable current becomes equal to or less than the predetermined ratio.

* * * * *